(12) United States Patent
Chang et al.

(10) Patent No.: US 11,688,930 B2
(45) Date of Patent: Jun. 27, 2023

(54) ANTENNA APPARATUS AND MOBILE TERMINAL

(71) Applicant: Huawei Technologies Co., Ltd., Shenzhen (CN)

(72) Inventors: Chih-Hua Chang, Taiwan (CN); Chien-Ming Lee, Shenzhen (CN); Dong Yu, Shanghai (CN); Hanyang Wang, Reading (GB); Yen-Cheng Lai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 72 days.

(21) Appl. No.: 17/053,678

(22) PCT Filed: May 8, 2018

(86) PCT No.: PCT/CN2018/086083
§ 371 (c)(1),
(2) Date: Nov. 6, 2020

(87) PCT Pub. No.: WO2019/213851
PCT Pub. Date: Nov. 14, 2019

(65) Prior Publication Data
US 2021/0075089 A1     Mar. 11, 2021

(51) Int. Cl.
*H01Q 1/24* (2006.01)
*H01Q 21/00* (2006.01)
(Continued)

(52) U.S. Cl.
CPC ............. *H01Q 1/243* (2013.01); *H01Q 1/242* (2013.01); *H01Q 21/0006* (2013.01); *H01Q 21/28* (2013.01); *H01Q 5/335* (2015.01)

(58) Field of Classification Search
CPC .... H01Q 1/242; H01Q 21/0006; H01Q 21/28; H01Q 1/243; H01Q 1/50; H01Q 5/335;
(Continued)

(56) References Cited

U.S. PATENT DOCUMENTS

| | | | | |
|---|---|---|---|---|
| 5,880,649 A | * | 3/1999 | Tai | H03H 7/463 333/132 |
| 6,249,687 B1 | * | 6/2001 | Thomsen | H01P 1/213 375/316 |

(Continued)

FOREIGN PATENT DOCUMENTS

| | | |
|---|---|---|
| CN | 104218306 A | 12/2014 |
| CN | 104795636 A | 7/2015 |

(Continued)

*Primary Examiner* — Ab Salam Alkassim, Jr.
*Assistant Examiner* — Bamidele A Jegede
(74) *Attorney, Agent, or Firm* — Slater Matsil, LLP

(57) ABSTRACT

An antenna apparatus includes two feeding parts, a filter matching network, and a radiator. The filter matching network includes a first port, a second port, and a third port. A first feeding part is electrically connected to the first port, a second feeding part is electrically connected to the second port, and the radiator is electrically connected to the third port. The first feeding part is configured to feed a low frequency signal and an intermediate frequency signal, the second feeding part is configured to feed a high frequency signal, the low frequency signal, the intermediate frequency signal, and the high frequency signal are respectively fed into the filter matching network by using the first feeding part and the second feeding part, and the filter matching network is configured to improve isolation between the low frequency signal and the intermediate frequency signal, and the high frequency signal.

20 Claims, 10 Drawing Sheets

(51) Int. Cl.
*H01Q 21/28* (2006.01)
*H01Q 5/335* (2015.01)

(58) Field of Classification Search
CPC ........ H01Q 5/385; H01Q 9/42; H04B 1/0458; H04B 1/18; H04B 1/005
See application file for complete search history.

(56) References Cited

U.S. PATENT DOCUMENTS

| | | | | |
|---|---|---|---|---|
| 6,445,743 B1* | 9/2002 | Arnold | ................ | G06K 7/0008 375/219 |
| 8,265,567 B2* | 9/2012 | Gorbachov | .............. | H04B 1/18 455/73 |
| 8,773,220 B2* | 7/2014 | Kim | ......................... | H03H 7/48 333/126 |
| 9,306,266 B2 | 4/2016 | Valkonen et al. | | |
| 9,819,077 B1* | 11/2017 | Desclos | ................. | H01Q 5/328 |
| 10,374,289 B2 | 8/2019 | Hu et al. | | |
| 2004/0239442 A1* | 12/2004 | Wilcox | ................ | H04B 1/0057 333/126 |
| 2005/0130602 A1* | 6/2005 | Guo | ......................... | H04B 1/52 455/78 |
| 2005/0192047 A1* | 9/2005 | Ishiwata | ................ | H03H 7/463 455/552.1 |
| 2005/0219010 A1* | 10/2005 | Erb | ..................... | H04B 1/0053 333/126 |
| 2006/0145782 A1* | 7/2006 | Liu | ......................... | H03H 7/463 333/132 |
| 2006/0205361 A1* | 9/2006 | Ruby | ................. | H04B 1/52 455/78 |
| 2007/0173210 A1* | 7/2007 | Cho | ......................... | H04B 1/52 455/78 |
| 2007/0241985 A1* | 10/2007 | Suzuki | ..................... | H01Q 1/50 343/859 |
| 2008/0238789 A1* | 10/2008 | Wilcox | ................... | H04B 1/18 343/750 |
| 2009/0295501 A1* | 12/2009 | Hayashi | ................. | H03H 7/463 333/132 |
| 2010/0091690 A1* | 4/2010 | Boyle | ................... | H04B 1/406 370/297 |
| 2012/0313731 A1* | 12/2012 | Burgener | ................ | H03H 9/64 333/188 |
| 2013/0057297 A1* | 3/2013 | Cheng | ................... | G01R 31/64 324/548 |
| 2013/0249767 A1* | 9/2013 | Ishizuka | ................. | H03H 7/38 333/124 |
| 2014/0055209 A1* | 2/2014 | Ishizuka | .............. | H04B 1/0057 333/129 |
| 2015/0188225 A1* | 7/2015 | Chang | ................... | H01Q 5/335 343/702 |
| 2015/0188230 A1 | 7/2015 | Kim et al. | | |
| 2015/0249292 A1 | 9/2015 | Ouyang et al. | | |
| 2015/0380812 A1* | 12/2015 | Black | ....................... | H01Q 9/42 343/861 |
| 2016/0064820 A1* | 3/2016 | Kim | ........................ | H01Q 7/00 343/767 |
| 2016/0126623 A1* | 5/2016 | Maxim | ............ | H01L 21/02282 343/860 |
| 2016/0190685 A1* | 6/2016 | Desclos | ................ | H04W 16/28 342/374 |
| 2016/0240924 A1* | 8/2016 | Ishizuka | ................ | H01Q 5/335 |
| 2017/0133999 A1* | 5/2017 | Ishizuka | ................ | H03H 9/64 |
| 2017/0170562 A1* | 6/2017 | Lee | ........................ | H01Q 9/14 |
| 2017/0201010 A1* | 7/2017 | Kim | ........................ | H01Q 7/00 |
| 2017/0207515 A1* | 7/2017 | Li | ............................ | H01Q 9/42 |
| 2017/0244818 A1* | 8/2017 | Kim | ...................... | H04M 1/0277 |
| 2017/0264018 A1* | 9/2017 | Hu | ......................... | H01Q 1/242 |
| 2017/0338545 A1* | 11/2017 | Guo | ........................ | H01Q 1/243 |
| 2017/0346159 A1* | 11/2017 | Xue | ........................ | H01Q 5/314 |
| 2017/0346524 A1* | 11/2017 | Kim | ........................ | H04B 1/48 |
| 2018/0026333 A1* | 1/2018 | Lee | ........................ | H01Q 13/18 343/702 |
| 2018/0026334 A1* | 1/2018 | Chen | ........................ | H01Q 9/42 343/702 |
| 2018/0083759 A1* | 3/2018 | Onaka | ................... | H04L 5/0098 |
| 2018/0183138 A1* | 6/2018 | Cheng | ................ | H04M 1/0277 |
| 2018/0248250 A1* | 8/2018 | Hsu | ........................ | H01Q 5/378 |

FOREIGN PATENT DOCUMENTS

| | | | | |
|---|---|---|---|---|
| CN | 105789881 A | 7/2016 | | |
| CN | 105940550 A | 9/2016 | | |
| CN | 107919523 A | 4/2018 | | |
| JP | H09270619 | * 4/1996 | ............. | H01Q 1/24 |
| JP | H09270619 A | 10/1997 | | |
| WO | 2016162685 A1 | 10/2016 | | |

* cited by examiner

ANTENNA APPARATUS AND MOBILE TERMINAL

CROSS-REFERENCE TO RELATED APPLICATIONS

This application is a national stage of International Application No. PCT/CN2018/086083, filed on May 8, 2018, which is hereby incorporated by reference in its entirety.

TECHNICAL FIELD

This application relates to the field of communications technologies, and specifically, to an antenna apparatus and a mobile terminal.

BACKGROUND

With development of science and technology, an antenna design in a mobile terminal (for example, a mobile phone) needs to cover a plurality of operating frequency bands, which may be simply classified into a low frequency band from 700 MHz to 960 MHz, an intermediate frequency band from 1710 MHz to 2170 MHz, and a high frequency band from 2300 MHz to 2700 MHz or a higher frequency band. From a perspective of an antenna design architecture, the antenna design architecture may be of a single feeding structure for having different resonances to cover the low frequency band, the intermediate frequency band, and the high frequency band, in other words, different frequency bands are manufactured in different antennas. This design occupies a large amount of space inside the mobile terminal, and an isolation structure is required between antennas.

Some people attempt to design the low frequency, the intermediate frequency and the high frequency in a same antenna architecture, but the following technical problem always exists: For the intermediate frequency and the high frequency, the frequency band of 2170 MHz is very close to the frequency band of 2300 MHz. Therefore, when a radio frequency circuit at a back end of an antenna uses a frequency dividing circuit to divide the intermediate frequency and the high frequency, the component loss (greater than 3 dB) can be caused in the high frequency band due to a design limitation of a circuit component. This affects high frequency performance.

SUMMARY

To resolve the foregoing technical problem, an embodiment of this application provides an antenna apparatus, to implement coverage of a plurality of frequency bands, and to ensure stable transmission of an intermediate frequency signal and a high frequency signal with relatively good isolation and low loss.

According to a first aspect, an embodiment of this application provides an antenna apparatus, including a first feeding part, a second feeding part, a filter matching network, and a radiator. The filter matching network includes a first port, a second port, and a third port. The first feeding part is electrically connected to the first port, the second feeding part is electrically connected to the second port, and the radiator is electrically connected to the third port. The first feeding part is configured to feed a low frequency signal and an intermediate frequency signal, the second feeding part is configured to feed a high frequency signal, a maximum frequency value of the low frequency signal and the intermediate frequency signal is 2170 MHz, a minimum frequency value of the high frequency signal is 2300 MHz, the low frequency signal, the intermediate frequency signal, and the high frequency signal are respectively fed the filter matching network by using the first feeding part and the second feeding part, and the filter matching network is configured to improve isolation between the low frequency signal and the intermediate frequency signal, and the high frequency signal.

In the prior art, a filter component needs to be used to perform frequency division on an intermediate frequency signal and the high frequency signal. The filter component is usually disposed in a radio frequency circuit at a back end of the antenna. A very large loss of a 2300 MHz signal is caused due to a function of the filter component. This results in a loss of the high frequency signal and affects performance of the antenna. However, in this embodiment of this application, the low frequency signal and the intermediate frequency signal are fed by the first feeding part, and the high frequency signal is fed by the second feeding part. In other words, the low frequency signal and the intermediate frequency signal are separated from the high frequency signal by the first feeding part and the second feeding part in a feed division manner, and no filter component needs to be disposed in the radio frequency circuit at the back end to perform frequency division on an intermediate frequency signal and the high frequency signal. In this way, stability of signals at the lowest frequency value of the high frequency signal and the highest frequency value of the low frequency signal and the intermediate frequency signal can be ensured, the loss of the 2300 MHz signal can be reduced, and a gain of the high frequency signal can be improved. The low frequency signal and the intermediate frequency signal are well isolated from the high frequency signal by using the filter matching network.

In an embodiment, the filter matching network includes a first filter circuit and a second filter circuit. The first filter circuit is electrically connected between the first port and the third port, and the second filter circuit is electrically connected between the second port and the third port. The first filter circuit is configured to transmit the low frequency signal and the intermediate frequency signal and block the high frequency signal, and the second filter circuit is configured to transmit the high frequency signal and block the low frequency signal and the intermediate frequency signal.

The first filter circuit and the second filter circuit are disposed to select and isolate the low frequency signal, the intermediate frequency signal and the high frequency signal, and to prevent crosstalk, so that the low frequency signal and the intermediate frequency signal are well isolated from the high frequency signal.

The filter matching network further includes a first matching circuit and a second matching circuit. The first matching circuit is electrically connected between the first port and the first filter circuit, and is configured to perform impedance matching on the low frequency signal and the intermediate frequency signal. The second matching circuit is electrically connected between the second port and the second filter circuit, and is configured to perform impedance matching on the high frequency signal. The first matching circuit and the second matching circuit respectively perform impedance matching on signals in different frequency bands, so that the antenna generates sufficient efficient bandwidths to cover different operating frequency bands.

The first filter circuit includes a first inductor, a second inductor, and a first capacitor. The first inductor is electrically connected between the ground and one end that is of the first matching circuit and that is away from the first port.

The second inductor and the first capacitor are sequentially connected in series, and are electrically connected between the ground and one end that is of the first inductor and that is close to the first matching circuit. One end that is of the second inductor and that is away from the first capacitor is electrically connected to the third port.

The second inductor and the first capacitor form a band-stop filter for the high frequency signal, and the first inductor and the first capacitor form a band-pass filter for the low frequency signal and the intermediate frequency signal, so that the first filter circuit transmits the low frequency signal and the intermediate frequency signal and blocks the high frequency signal, and this ensures a good filtering effect. In addition, two filters may be formed by using three components: the first inductor, the second inductor, and the first capacitor, and a structure is simple.

The second filter circuit includes a third inductor, a fourth inductor, and a second capacitor. The third inductor is electrically connected between the ground and one end that is of the second matching circuit and that is away from the second port. The fourth inductor and the second capacitor are connected in parallel. One end of the fourth inductor is electrically connected to one end that is of the third inductor and that is away from the ground, and the other end of the fourth inductor is electrically connected to the third port.

The fourth inductor and the second capacitor form a band-stop filter for an intermediate frequency, and the third inductor forms a band-stop filter for a low frequency, so that the second filter transmits the high frequency signal and blocks the low frequency signal and the intermediate frequency signal.

The first matching circuit includes a fifth inductor, a sixth inductor, a seventh inductor, a third capacitor, and a fourth capacitor. The fifth inductor and the sixth inductor are connected in series between the second port and the ground, the third capacitor is connected between the ground and one end that is of the sixth inductor and that is away from the ground, and the seventh inductor and the fourth capacitor are connected in series between one end that is of the third capacitor and that is away from the ground and one end that is of the first inductor and that is away from the ground. The second matching circuit includes a fifth capacitor and a sixth capacitor. The fifth capacitor is electrically connected between the second port and the ground, and the sixth capacitor is connected between one end that is of the fifth capacitor and that is away from the ground and the end that is of the third inductor and that is away from the ground.

The first matching circuit and the second matching circuit perform impedance matching on radio frequency signals fed by the first feeding part and the second feeding part, so that the antenna can generate a better efficient bandwidth to cover a required operating frequency band.

In an implementation, the first filter circuit includes a first inductor and a second inductor. The first inductor and the second inductor are connected in series between the ground and one end that is of the first matching circuit and that is away from the first port. One end that is of the second inductor and that is away from the ground is electrically connected to the third port.

The first inductor and the second inductor are disposed to form a band-stop filter to block an intermediate frequency signal and a high frequency signal and transmit a low frequency signal. Therefore, the low frequency signal is isolated from the intermediate frequency signal and the high frequency signal, to ensure good isolation.

The second filter circuit includes a third inductor and a first capacitor. The third inductor is electrically connected between the ground and one end that is of the second matching circuit and that is away from the second port. The first capacitor is electrically connected between the third port and one end that is of the third inductor and that is away from the ground.

The third inductor and the first capacitor are disposed to form a band-stop filter to block a low frequency and transmit an intermediate frequency signal and a high frequency signal.

The first matching circuit includes a fourth inductor and a second capacitor. The fourth inductor and the second capacitor are sequentially connected in series between the first port and the ground, and one end that is of the second capacitor and that is away from the ground is electrically connected to one end that is of the first inductor and that is away from the second inductor. The second matching circuit includes a fifth inductor and a third capacitor. The fifth inductor and the third capacitor are sequentially connected in series between the second port and the end that is of the third inductor and that is away from the ground.

The first matching circuit and the second matching circuit perform impedance matching on radio frequency signals fed by the first feeding part and the second feeding part, so that the antenna can generate a better efficient bandwidth to cover a required operating frequency band.

The antenna apparatus further includes a third feeding part and a fourth port. The filter matching circuit further includes a third filter circuit and a third matching circuit. The third feeding part is electrically connected to the fourth port, the third matching circuit and the third filter circuit are sequentially connected in series between the fourth port and the third port, the third feeding part is configured to feed a low frequency signal, the low frequency signal does not overlap the intermediate frequency signal, a highest frequency value of the low frequency signal is 960 MHz, and a lowest frequency value of the intermediate frequency signal is 1700 MHz.

An electromagnetic wave signal is fed by dividing into the low frequency signal, the intermediate frequency signal, and the high frequency signal. The third filter circuit is disposed to transmit the low frequency signal and block the intermediate frequency signal and the high frequency signal. The first filter circuit transmits the intermediate frequency signal and blocks the low frequency signal and the high frequency signal. The second filter circuit transmits the high frequency signal and blocks the low frequency signal and the intermediate frequency signal. The radiator generates radiation of the low frequency signal, the intermediate frequency signal, and the high frequency signal. The low frequency signal and the intermediate frequency signal are well isolated from the high frequency signal. The third matching circuit is disposed to perform impedance matching on signals in different frequency bands in combination with the first matching circuit and the second matching circuit, so that the low frequency signal, the intermediate frequency signal, and the high frequency signal all have a good bandwidth, and meet a requirement of wireless communication.

The antenna apparatus further includes a main board and a frame of a mobile terminal. The mobile terminal includes two opposite long sides and two opposite short sides. The frame includes a first frame of the short side and a second frame of the long side. The radiator is disposed on the first frame, and the first feeding part and the second feeding part are disposed on the main board.

The radiator is properly disposed on the mobile terminal, to be specific, the radiator is disposed on the first frame, to implement an effect of reducing a clearance area required by the antenna.

A first gap and a second gap are disposed on the first frame, so that the first frame is divided into a first segment, a second segment, and a third segment. The first segment and the third segment are respectively located on two sides of the second segment, the first segment and the third segment each extend to the second frame, and the filter matching network is electrically connected to the second segment, so that the second segment forms the radiator.

The first frame is divided into three segments, and the second segment is used as the radiator, so that the antenna may form a monopole antenna or an IFA antenna.

The second segment is further connected to a first ground segment, a first ground point is further disposed on the main board, and the first ground segment is connected to the first ground point. The first ground terminal is disposed and grounded, so that the antenna can form a complete current loop.

The second segment is further connected to an extension segment, one end of the extension segment is connected to one end that is of the second segment and that is away from the first ground segment, the other end of the extension segment is connected to the filter matching network, and the extension segment, the second segment, and the ground segment form a loop antenna. By setting the radiator as a loop antenna structure, and by using better radiation performance of the loop antenna, the required clearance area can be further reduced.

A second ground point is further disposed on the main board, an extension segment is further connected to a second ground segment, and the second ground segment is connected to the second ground point.

The second ground segment is of a single-pole multi-throw switch structure, and the single-pole multi-throw switch is selectively turned on or off to adjust a resonance frequency of the low frequency signal and broaden an operating frequency band of the low frequency signal.

The second ground segment is of the switch structure, and the switch is turned on or off to adjust the resonance frequency of the low frequency signal and broaden the operating frequency band of the low frequency signal A third gap and a fourth gap are provided on the second frames of the two opposite long edges, so that two opposite ends of the first segment respectively correspond to the first gap and the third gap, two opposite ends of the third segment respectively correspond to the second gap and the fourth gap, and the first segment and the third segment form a parasitic antenna of the second segment.

The first segment and the third segment are disposed to form the parasitic antenna of the second segment, and a current flowing in the second segment generates a coupling current in the first segment and the third segment, so that electromagnetic wave radiation is also generated in the first segment and the third segment.

A third ground point is further disposed on the main board, and one end that is of the first segment and that corresponds to the third gap is connected to the third ground point.

A third ground point is disposed to ground the first segment, so that the parasitic antenna formed in the first segment forms a complete current loop.

A fourth ground point is further disposed on the main board, and one end that is of the first segment and that corresponds to the first gap is connected to the fourth ground point.

The fourth ground point is disposed to ground ends of the first segment, so that the parasitic antenna formed in the first segment is a loop antenna, which forms a complete current loop.

According to a second aspect, an embodiment of this application further provides a mobile terminal, including a main board and the antenna apparatus according to the first aspect. The main board is configured to feed an electromagnetic wave signal into the antenna apparatus.

DETAILED DESCRIPTION OF ILLUSTRATIVE EMBODIMENTS

Embodiments of this application provide a mobile terminal, including a main board and the antenna apparatus provided in the embodiments of this application. The main board is configured to feed an electromagnetic wave signal into the antenna apparatus. The mobile terminal may be a handheld/wearable device such as a smartphone, a tablet computer, a laptop computer, or a smart watch, and can implement multi-frequency wireless communication.

Figure 1:
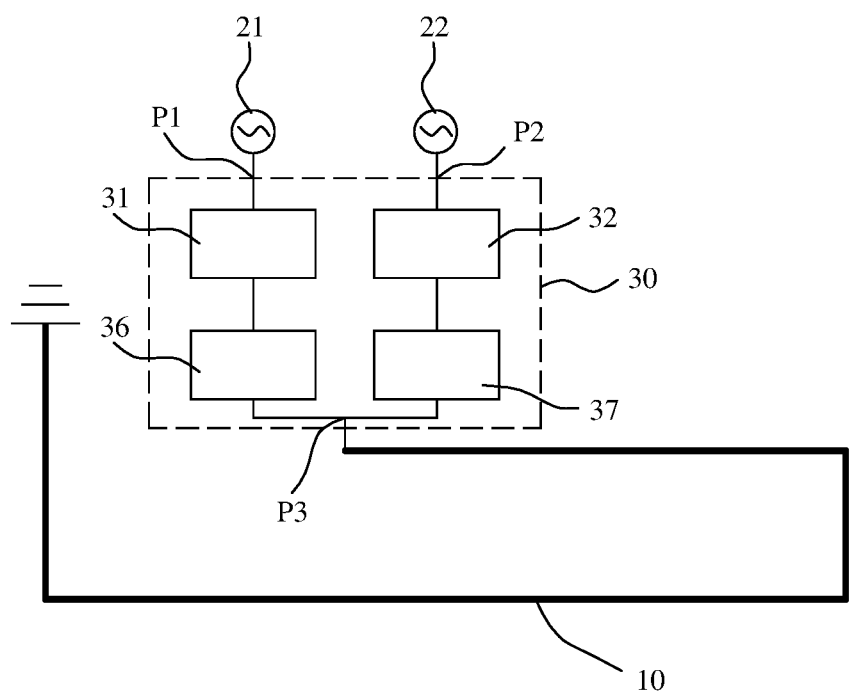
FIG. 1 is a schematic structural diagram of an antenna apparatus according to an embodiment of this application.

Referring to FIG. 1, an embodiment of this application provides an antenna apparatus, including a first feeding part 21, a second feeding part 22, a filter matching network 30, and a radiator 10. The filter matching network 30 includes a first port P1, a second port P2, and a third port P3. The first feeding part 21 is electrically connected to the first port P1, the second feeding part 22 is electrically connected to the second port P2, and the radiator 10 is electrically connected to the third port P3. The first feeding part 21 is configured to feed a low frequency signal and an intermediate frequency signal, and the second feeding part 22 is configured to feed a high frequency signal. A maximum frequency value of the low frequency signal and the intermediate frequency signal is 2170 MHz, and a minimum frequency value of the high frequency signal is 2300 MHz. For example, frequency band ranges of the low frequency signal and the intermediate frequency signal are a low frequency band from 700 MHz to 960 MHz (namely, a 2G communication frequency band), and an intermediate frequency band from 1710 MHz to 2170 MHz (namely, a 3G communication frequency band), and a frequency band range of the high frequency signal is from 2300 MHz to 2700 MHz (namely, a 4G communication frequency band). The low frequency signal and the intermediate frequency signal, and the high frequency signal are respectively transmitted to the filter matching network 30 by using the first feeding part 21 and the second feeding part 22. The filter matching network 30 is configured to improve isolation between the low frequency signal and the intermediate frequency signal, and the high frequency signal.

In the prior art, a filter component needs to be used to perform frequency division on an intermediate frequency signal and a high frequency signal. The filter component is usually disposed in a radio frequency circuit at a back end of an antenna. A very large loss of a 2300 MHz signal is caused due to a function of the filter component. This results in a loss of the high frequency signal and affects performance of the antenna. However, in this embodiment of this application, the low frequency signal and the intermediate frequency signal are fed by the first feeding part 21 and the high frequency signal is fed by the second feeding part 22. In other words, the low frequency signal and the intermediate frequency signal are separated by the high frequency signal by the first feeding part 21 and the second feeding part 22 in a feed division manner, and no filter component needs to be disposed in the radio frequency circuit at the back end to perform frequency division on an intermediate frequency signal and the high frequency signal. In this way, stability of signals at the lowest frequency value of the high frequency signal and the highest frequency value of the low frequency signal and the intermediate frequency signal can be ensured, the loss of the 2300 MHz signal can be reduced, and a gain of the high frequency signal can be improved. The low frequency signal and the intermediate frequency signal are well isolated from the high frequency signal by using the filter matching network.

To enable the filter matching network 30 to ensure good isolation, the filter matching network 30 needs to perform signal selection on the low frequency signal, the intermediate frequency signal, and the high frequency signal. Specifically, the filter matching network 30 includes a first filter circuit 36 and a second filter circuit 37. The first filter circuit 36 is electrically connected between the first port P1 and the third port P3, and the second filter circuit 37 is electrically connected between the second port P2 and the third port P3. The first filter circuit 36 is configured to transmit the low frequency signal and the intermediate frequency signal and block the high frequency signal, and the second filter circuit 37 is configured to transmit the high frequency signal and block the low frequency signal and the intermediate frequency signal.

The first filter circuit 36 and the second filter circuit 37 include a plurality of electronic components. The plurality of electronic components are combined, and a proper type selection and a proper layout are performed, to select and isolate the low frequency signal, the intermediate frequency signal, and the high frequency signal, and to prevent crosstalk, so that the low frequency signal and the intermediate frequency signal are well isolated from the high frequency signal at the third port P3.

To obtain sufficient efficient bandwidths to cover an operating frequency band, the filter matching network 30 is further provided with an impedance matching structure. Specifically, the filter matching network 30 further includes a first matching circuit 31 and a second matching circuit 32. The first matching circuit 31 is electrically connected between the first port P1 and the first filter circuit 36, and is configured to perform impedance matching on the low frequency signal and the intermediate frequency signal. The second matching circuit 32 is electrically connected between the second port P2 and the second filter circuit 37, and is configured to perform impedance matching on the high frequency signal. The first matching circuit 31 and the second matching circuit 32 may alternatively be integrated into the first filter circuit 36 and the second filter circuit 37.

The first matching circuit 31 and the second matching circuit 32 include a plurality of electronic components. The plurality of electronic components are combined, and a proper type selection and a proper layout are performed, to implement impedance matching on the low frequency signal, the intermediate frequency signal, and the high frequency signal, so that the antenna generates sufficient efficient bandwidths to cover different operating frequency bands.

In this embodiment, the antenna apparatus is used as a transmit antenna, and an input impedance of the first feeding part 21 and the second feeding part 22 may be not 50 ohm. By filtering and impedance matching of the filter matching network 30, an output impedance of the third port P3 may be 50 ohm. This reduces design difficulty of the first feeding part 21 and the second feeding part 22, and expands the application scope of the antenna apparatus.

The antenna apparatus in this embodiment is used as a receive antenna, and an input impedance of an electromagnetic wave signal received by the radiator 10 may also be not 50 ohm. An output impedance of the first port P1 and the second port P2 may be 50 ohm through filtering and matching of the filter matching network 30. Then, two different electromagnetic wave signals are transmitted to corresponding signal processing components (not shown in the figure). Certainly, the signal processing components may alternatively be disposed as the first feeding part 21 and the second feeding part 22. The signal processing components complete signal demodulation, so that the antenna can receive a complex electromagnetic wave signal.

It can be learned from the foregoing description that, the filter matching network disposed in the antenna apparatus in this embodiment is different from a conventional duplexer. Generally, impedances of an input end and two output ends of the duplexer are both 50 ohm. For example, when an input impedance of a signal received by the antenna is not 50 ohm, a matching circuit needs to be added between the duplexer and the antenna. However, in this embodiment, when the radiator 10 receives the signal whose input impedance is not 50 ohm, the signal may be first divided into two signals by using the first filter circuit 36 and the second filter circuit 37 of the filter matching network 30, and then the first matching circuit 31 and the second matching circuit 32 perform impedance matching on the two signals, to output two signals whose impedances are 50 ohm.

Figure 2:
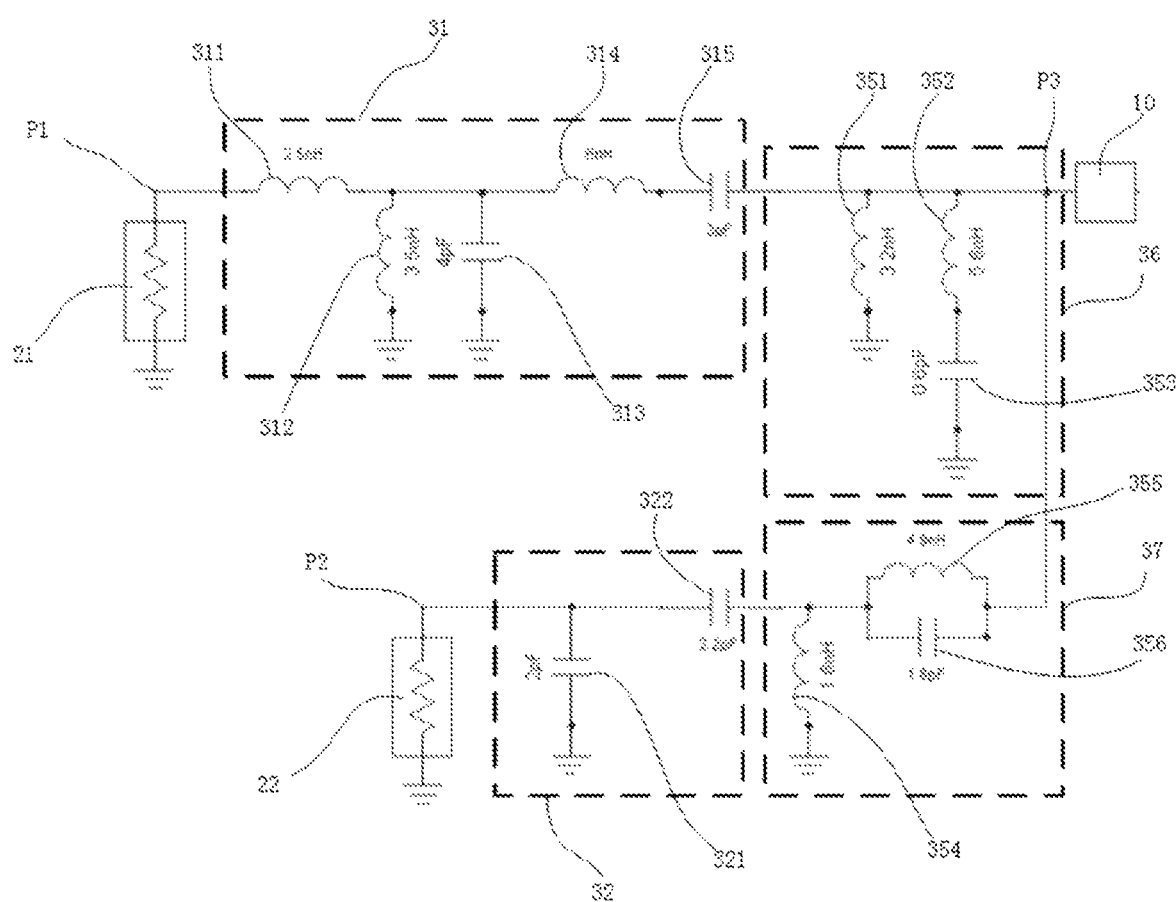
FIG. 2 is a schematic diagram of a circuit structure of an antenna apparatus according to an embodiment of this application.

Referring to FIG. 2, in an embodiment, the first filter circuit 36 includes a first inductor 251, a second inductor 252, and a first capacitor 253. The first inductor 251 is electrically connected between the ground and one end that is of the first matching circuit 31 and that is away from the first port P1. The second inductor 252 and the first capacitor 253 are sequentially connected in series, and are electrically connected between the ground and one end that is of the first inductor 251 and that is close to the first matching circuit 31. One end that is of the second inductor 252 and that is away from the first capacitor 253 is electrically connected to the third port P3. The second filter circuit 37 includes a third inductor 254, a fourth inductor 255, and a second capacitor 256. The third inductor 254 is electrically connected between the ground and one end that is of the second matching circuit 32 and that is away from the second port P2. The fourth inductor 255 and the second capacitor 256 are connected in parallel. One end of the fourth inductor 255 is electrically connected to one end that is of the third inductor 254 and that is away from the ground, and the other end of the fourth inductor 255 is electrically connected to the third port P3.

The second inductor 252 and the first capacitor 253 form a band-stop filter for a high frequency signal, and the first inductor 251 and the first capacitor 253 form a band-pass filter for a low frequency signal and an intermediate frequency signal, so that the first filter circuit 36 transmits the low frequency signal and the intermediate frequency signal and blocks the high frequency signal, and this ensures a good signal selection effect. In addition, two filters may be formed by using three components: the first inductor 251, the second inductor 252, and the first capacitor 253, and a structure is simple.

The fourth inductor 255 and the second capacitor 256 form a band-stop filter for an intermediate frequency, and the third inductor 254 forms a band-stop filter for a low frequency, so that the second filter 37 transmits the high frequency signal and blocks the low frequency signal and the intermediate frequency signal.

The first matching circuit 31 includes a fifth inductor 211, a sixth inductor 212, a seventh inductor 214, a third capacitor 213, and a fourth capacitor 215. The fifth inductor 211 and the sixth inductor 212 are connected in series between the second port P2 and the ground. The third capacitor 213 is connected between the ground and one end that is of the sixth inductor 212 and that is away from the ground. The seventh inductor 214 and the fourth capacitor 215 are connected in series between one end that is of the third capacitor 213 and that is away from the ground and one end that is of the first inductor 251 and that is away from the ground. The second matching circuit 32 includes a fifth capacitor 221 and a sixth capacitor 222. The fifth capacitor 221 is electrically connected between the second port P2 and the ground. The sixth capacitor 222 is connected between one end that is of the fifth capacitor 221 and that is away from the ground and the end that is of the third inductor 254 and that is away from the ground. The first matching circuit 31 and the second matching circuit 32 perform impedance matching on radio frequency signals (namely, the low frequency signal, the intermediate frequency signal, and the high frequency signal) fed by the first feeding part 21 and the second feeding part 22, so that an antenna can generate a better efficient bandwidth to cover a required operating frequency band.

Specific models and parameters of the foregoing components are not limited in this embodiment. However, to fully understand the implementation of this application, the following provides a specific component selection. However, it should be understood that each component may have another selection.

Referring to FIG. 2, the first inductor 251 is 3.2 nH, the second inductor 252 is 5.6 nH, the first capacitor 253 is 0.6 pF, the third inductor 254 is 1.6 nH, the fourth inductor 255 is 4.9 nH, the second capacitor 256 is 1.6 pF, the fifth inductor 211 is 2.5 nH, the sixth inductor 212 is 3.5 nH, the third capacitor 213 is 4 pF, the seventh inductor 214 is 6 nH, the fourth capacitor 215 is 3 pF, the fifth capacitor 221 is 2 pF, and the sixth capacitor 222 is 2.2 pF.

After the preceding settings, the antenna apparatus in this embodiment can generate an efficient bandwidth, to cover operating frequency bands whose frequency band ranges of the low frequency signal, the intermediate frequency signal and the high frequency signal respectively are: low frequency band from 700 MHz to 960 MHz (namely, a 2G communication frequency band), an intermediate frequency band from 1710 MHz to 2170 MHz (namely, a 3G communication frequency band), and a high frequency band from 2300 MHz to 2700 MHz (namely, a 4G communication frequency band), so as to implement multi-frequency performance, ensure good isolation, and improve benefits of the high frequency signal.

Figure 3:
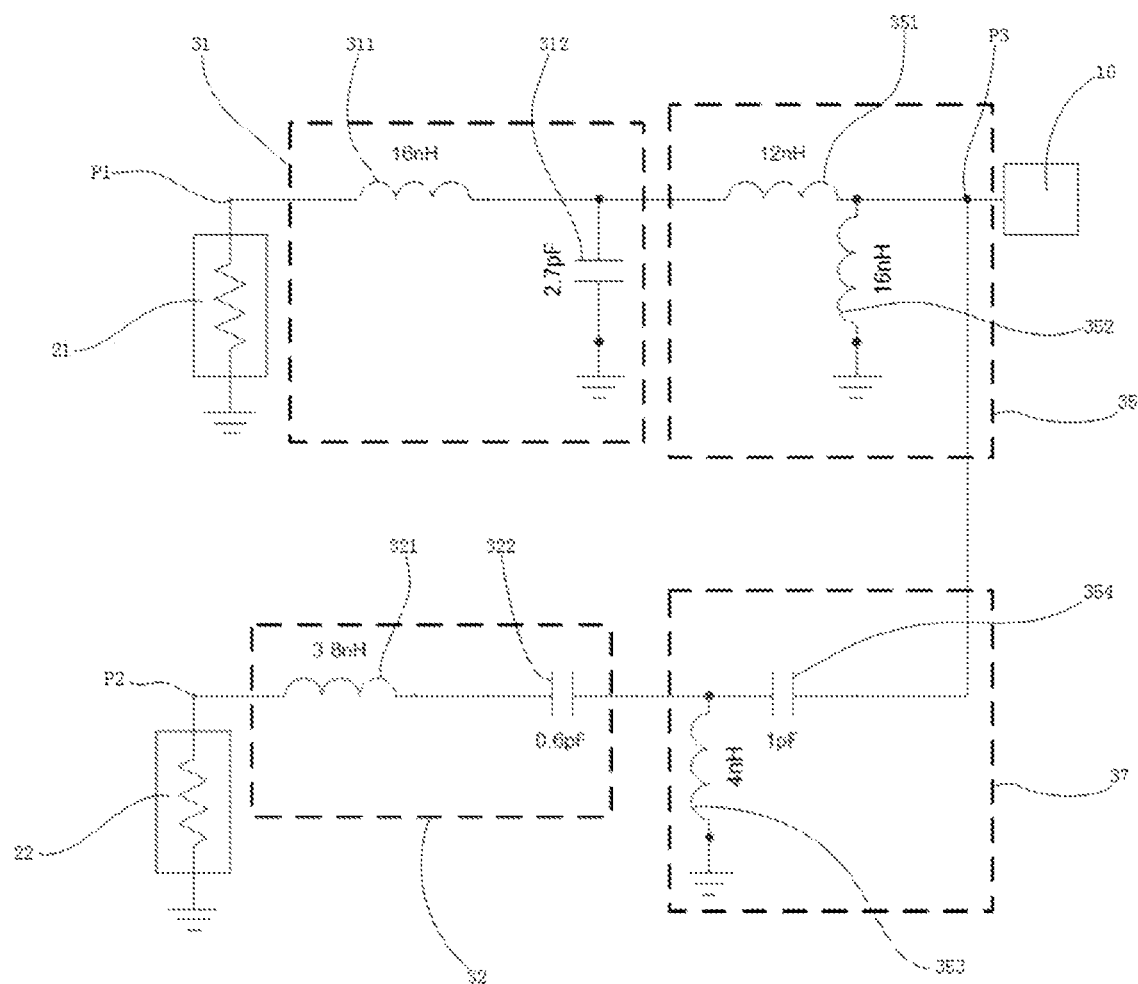
FIG. 3 is a schematic diagram of a circuit structure of an antenna apparatus according to an embodiment of this application.

Referring to FIG. 3, in another embodiment, the first filter circuit 36 includes a first inductor 351 and a second inductor 352. The first inductor 351 and the second inductor 352 are connected in series between the ground and one end that is of the first matching circuit 31 and that is away from the first port P1. One end that is of the second inductor 352 and that is away from the ground is electrically connected to the third port P3. The second filter circuit 37 includes a third inductor 353 and a first capacitor 354. The third inductor 353 is electrically connected between the ground and one end that is of the second matching circuit 32 and that is away from the second port P2. The first capacitor 354 is electrically connected between the third port P3 and one end that is of the third inductor 353 and that is away from the ground.

The first inductor 351 and the second inductor 352 are disposed to block a high frequency signal. A band-stop filter of a low frequency signal and an intermediate frequency signal is disposed to block the low frequency signal and the intermediate frequency signal by using the third inductor 353 and the first capacitor 354. A band-stop filter of a high frequency signal is disposed to select a signal from the low frequency signal, the intermediate frequency signal, and the high frequency signal, to ensure good isolation.

The first matching circuit 31 includes a fourth inductor 311 and a second capacitor 312. The fourth inductor 311 and the second capacitor 312 are sequentially connected in series between the first port P1 and the ground. One end that is of the second capacitor 312 and that is away from the ground is electrically connected to one end that is of the first inductor 351 and that is away from the second inductor 352. The second matching circuit 32 includes a fifth inductor 321 and a third capacitor 322. The fifth inductor 321 and the third capacitor 322 are sequentially connected in series between the second port P2 and the end that is of the third inductor 353 and that is away from the ground. The first matching circuit 31 and the second matching circuit 32 perform impedance matching on radio frequency signals (namely, the low frequency signal, an intermediate frequency signal, and a high frequency signal) fed by the first feeding part 21 and the second feeding part 22, so that an antenna can generate a better efficient bandwidth to cover a required operating frequency band.

Specific models and parameters of the foregoing components are not limited in this embodiment. However, to fully understand the implementation of this application, the following provides a specific component selection. However, it should be understood that each component may have another selection.

With reference to FIG. 3, the first inductor 351 is 12 nH, the second inductor 352 is 16 nH, the third inductor 353 is 4 nH, the first capacitor 354 is 1 pF, the fourth inductor 311 is 16 nH, the second capacitor 312 is 2.7 pF, the fifth inductor 321 is 3.8 nH, and the third capacitor 322 is 0.6 pF.

According to the foregoing settings, the antenna apparatus in this embodiment can generate an efficient bandwidth, to cover operating frequency bands whose frequency band ranges of the low frequency signal, the intermediate frequency signal, and the high frequency signal respectively are from 700 MHz to 960 MHz, from 1710 MHz to 2170 MHz, and from 2300 MHz to 2700 MHz, so as to implement multi-frequency performance, ensure good isolation, and improve benefits of the high frequency signal.

Figure 4:
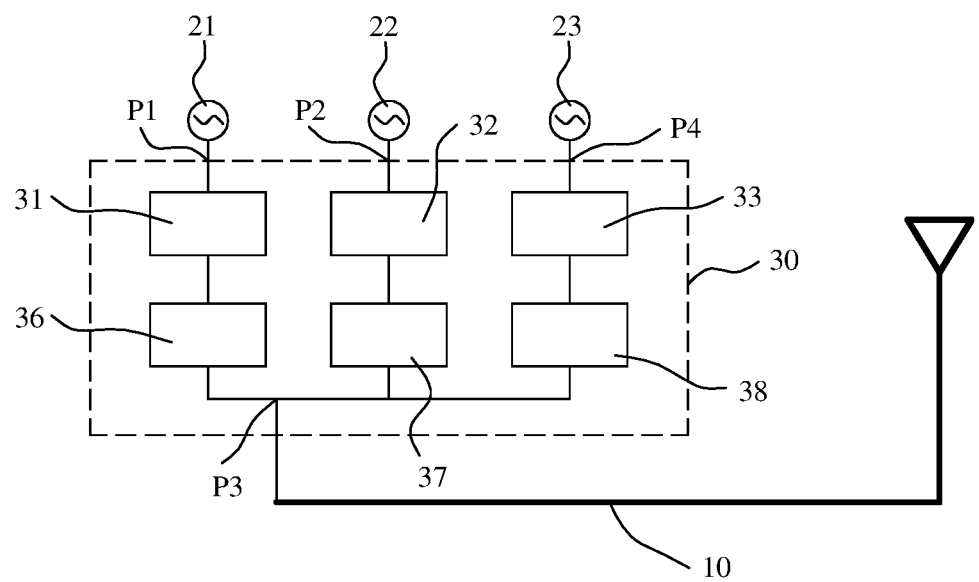
FIG. 4 is a schematic structural diagram of an antenna apparatus according to an embodiment of this application.

Referring to FIG. 4, in an embodiment, the antenna apparatus further includes a third feeding part 23 and a fourth port P4. The filter matching circuit 35 further includes a third filter circuit 38 and a third matching circuit 33. The third feeding part 23 is electrically connected to the fourth port P4, the third matching circuit 33 and the third filter circuit 38 are sequentially connected in series between the fourth port P4 and the third port P3, the third feeding part 23 is configured to feed a low frequency signal, the low frequency signal does not overlap the intermediate frequency signal, a highest frequency value of the low frequency signal is 960 MHz, and a lowest frequency value of the intermediate frequency signal is 1700 MHz.

In this embodiment, a frequency range of the low frequency signal may be from 700 MHz to 960 MHz, and a frequency range of the intermediate frequency signal may be from 1700 MHz to 2170 MHz. The electromagnetic wave signal is fed by dividing into the low frequency signal, the intermediate frequency signal, and a high frequency signal. The third filter circuit 38 is disposed to transmit the low frequency signal and block the intermediate frequency signal and the high frequency signal. The first filter circuit 36 transmits the intermediate frequency signal and blocks the low frequency signal and the high frequency signal. The second filter circuit 37 transmits the high frequency signal and blocks the low frequency signal and the intermediate frequency signal. The radiator 10 generates radiation of the low frequency signal, the intermediate frequency signal, and the high frequency signal. The low frequency signal and the intermediate frequency signal are well isolated from the high frequency signal. The third matching circuit 33 is disposed to perform impedance matching on signals in different frequency bands in combination with the first matching circuit 31 and the second matching circuit 32, so that the low frequency signal, the intermediate frequency signal, and the high frequency signal all have a good bandwidth, and meet a requirement of wireless communication.

In the foregoing embodiments, the radiator 10 may use a loop antenna, a monopole antenna, an IFA (inverted F antenna, inverted-Antenna) antenna, or a slot antenna. FIG. 1 shows a loop antenna, and FIG. 4 shows a monopole antenna.

Figure 5:
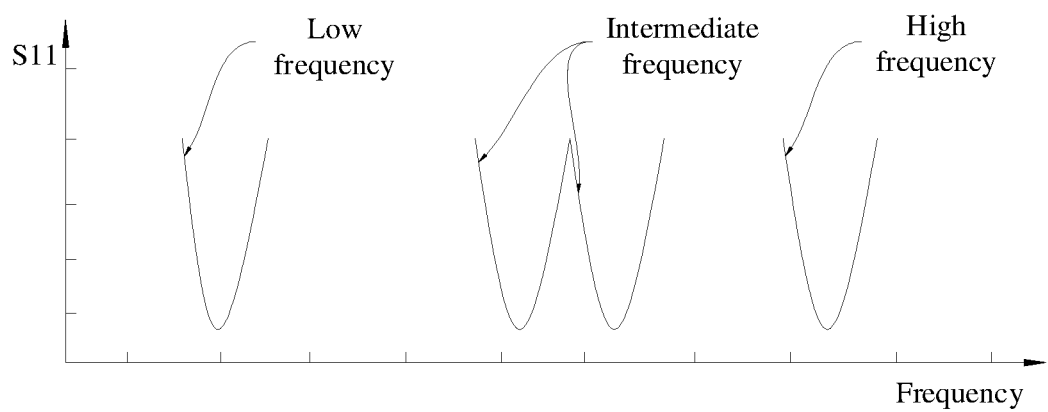
FIG. 5 is a schematic diagram of a test result of a return loss (S11) of an antenna apparatus according to this application.

Referring to FIG. 5, it can be learned from a schematic diagram of a return loss (S11) of an antenna that an electromagnetic wave may generate resonance frequencies to cover a low frequency, an intermediate frequency, and a high frequency on a radiator 10, so that the antenna apparatus in this application can generate sufficient efficient bandwidths to cover an operation frequency band.

Figure 6:
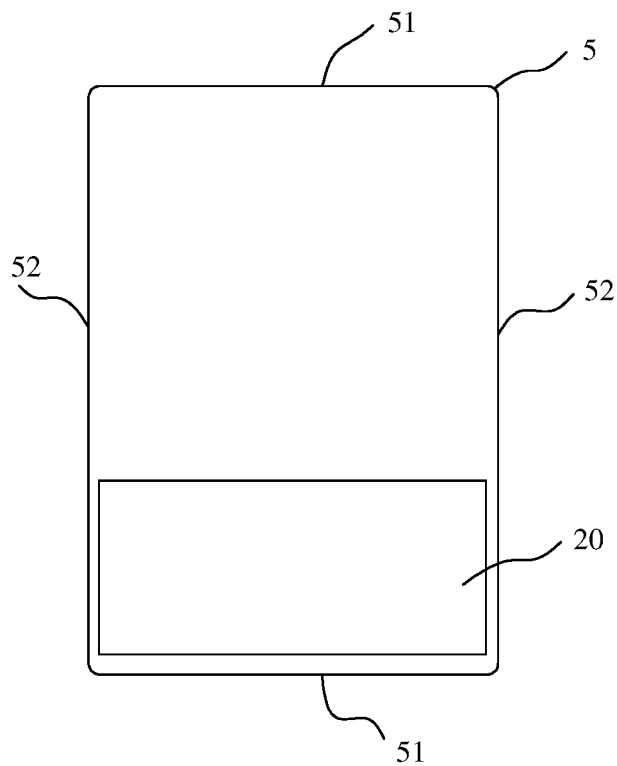
FIG. 6 is a schematic structural diagram of a mobile terminal according to an embodiment of this application.
Figure 7:
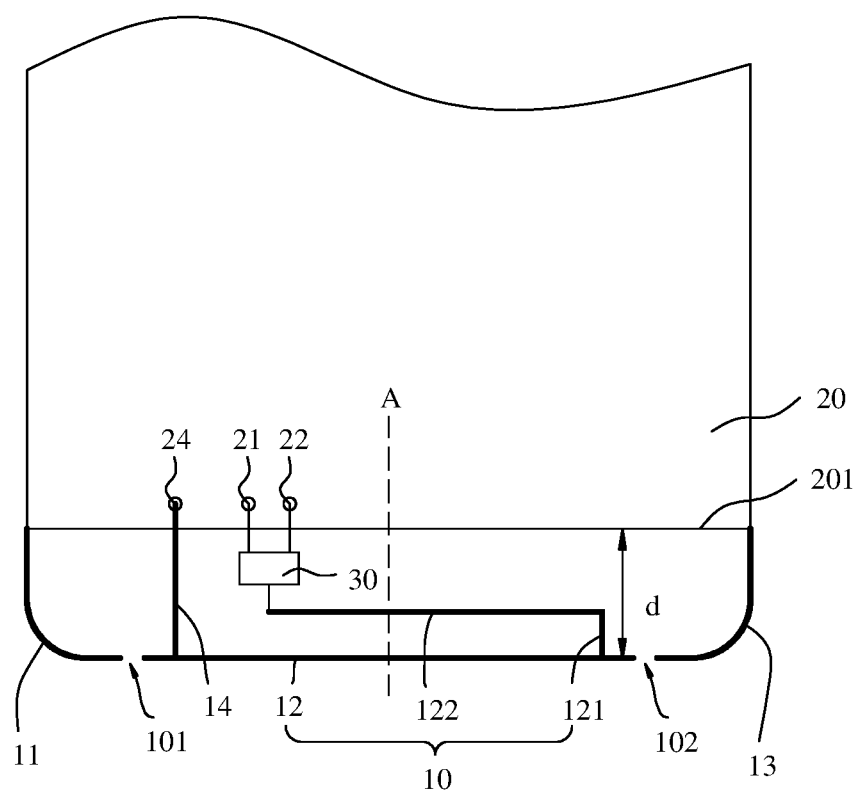
FIG. 7 is a schematic structural diagram of an antenna apparatus disposed on a mobile terminal according to an embodiment of this application.

Referring to FIG. 6 and FIG. 7, in an embodiment, the antenna apparatus further includes a main board 20 and a frame 5 of a mobile terminal, the mobile terminal includes two opposite long sides and two short sides, the frame 5 includes a first frame 51 of the short side and a second frame 52 of the long side, the radiator 10 is disposed on the first frame 51, and the first feeding part 21 and the second feeding part 22 are disposed on the main board 20.

The frame 5 is made of a metal material, the radiator 10 may be a structure of the first frame 51 or may be connected to the first frame 51. The frame 5 may alternatively be made of a non-metal material, and a metal structure of the radiator 10 is attached to the first frame 51.

It can be learned from the foregoing description that the first feeding part 21, the second feeding part 22, and the filter matching network 30 may be disposed, so that the antenna has multi-frequency radiation performance, relatively high gain, and isolation. Based on this, the radiator 10 is properly disposed on the mobile terminal, to be specific, the radiator 10 is disposed on the first frame 51, to implement an effect of reducing a clearance area required by the antenna. Referring to FIG. 7, a clearance distance d between an inner side of the first frame 51 and a metal edge of the main board 20 (or an edge of a metal plate of a screen component, which is closer to the first frame 51) may be further reduced, so that the clearance distance d is less than 2 mm, and the antenna in this embodiment may be applied to a mobile terminal with a narrow frame.

Referring to FIG. 6 and FIG. 7, in an embodiment, a first gap 102 and a second gap 103 are disposed on the first frame 51, so that the first frame 51 is divided into a first segment 11, a second segment 12, and a third segment 13, and the first segment 11 and the third segment 13 are respectively located on two sides of the second segment 12, the first segment 11 and the third segment 13 each extend to the second frame 52, and the filter matching network 30 is electrically connected to the second segment 12, so that the second segment 12 forms the radiator 10. The first frame 51 is divided into three segments, and the second segment 12 is used as the radiator 10, so that the antenna may form a monopole antenna or an IFA antenna.

Referring to FIG. 7, in an embodiment, the second segment 12 is further connected to a first ground segment 14, a first ground point 24 is further disposed on the main board 20, and the first ground segment 14 is connected to the first ground point 24. The first ground segment 14 is disposed and grounded, so that the antenna can form a complete current loop.

Referring to FIG. 7, in an embodiment, the second segment 12 is further connected to an extension segment 122. One end of the extension segment 122 is connected to one end that is of the second segment 12 and that is away from the first ground segment 14, and the other end is connected to the filter matching network 30. The extension segment 122, the second segment 12, and the ground segment 14 form a loop antenna. By setting the radiator 10 as a loop antenna structure, and by using better radiation performance of the loop antenna than other types of antennas in a small clearance area, a size of a required clearance area may be further reduced, and a clearance distance d may be reduced to about 1.5 mm, to meet a requirement of a mobile terminal with a large screen-to-body ratio, for example, a communication requirement of a frame-less phone.

Different specific structures may be further configured for the loop antenna structure based on a requirement. As shown in FIG. 7, a first feeding part 21, a second feeding part 22, and a first ground point 24 are all disposed on a left side of a normal line A at a midpoint of the second segment 12. It is defined that a left-feed structure is in which a feeding position and a ground position are located on the left side of the normal line A, a middle-feed structure is in which the feeding position and the ground position are respectively located on two sides of the normal line A and are symmetrically disposed, and a right-feed structure is in which the feeding position and the ground position are located on a right side of the normal line A. In all embodiments of this application, the left-feed structure, the middle-feed structure, or the right-feed structure may be used. Preferably, the left-feed structure is used, so that an intermediate frequency signal and a high frequency signal have relatively good antenna performance. To keep a proper distance between the extension segment 122 and the second segment 12 to increase a clearance area in the radiator 10, the first connection segment 121 may be disposed to connect between the second segment 12 and the extension segment 122, and an extension direction of the extension segment 122 is parallel to an extension direction of the second segment 12. In this way, the radiator 10 forms an annular structure in which the extension segment 122, the first connection segment 121, the second segment 12, and the first ground segment 14 are sequentially connected.

Figure 8:
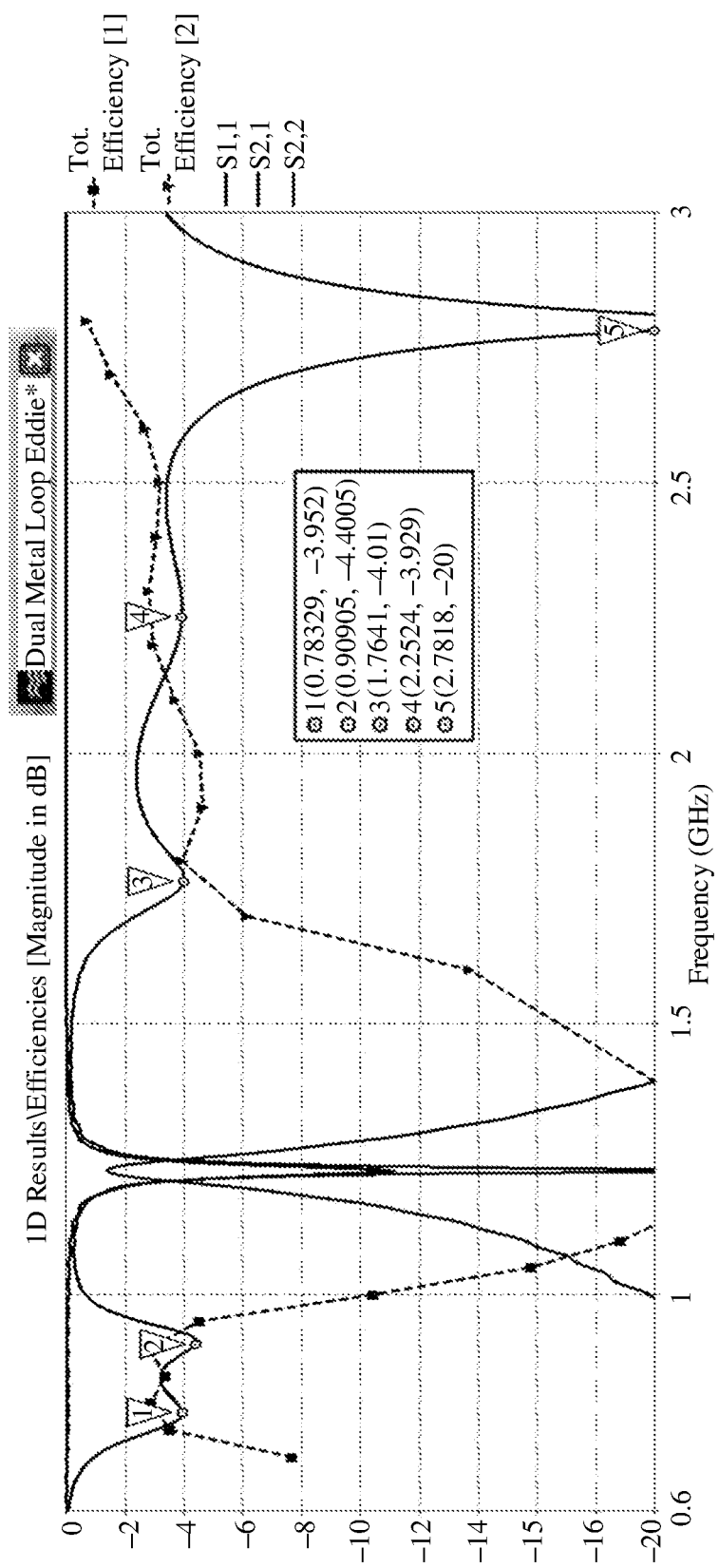
FIG. 8 is a schematic diagram of simulation results of a return loss and antenna efficiency of the antenna apparatus in FIG. 7.

Referring to FIG. 8, the radiator 10 in FIG. 7 is configured as a loop antenna structure of a left-fed structure. A signal of a first frequency band fed by a first feeding part 21 is a low frequency signal, and signals of a second frequency band fed by the second feeding part 22 are an intermediate frequency signal and a high frequency signal. Analog simulation is performed on an antenna apparatus to obtain an antenna return loss curve (solid line) and a system efficiency curve (dashed line). It can be seen that resonance is generated in a low frequency part, an intermediate frequency part, and a high frequency part. In addition, a relatively wide bandwidth is covered. Antenna efficiency is at a relatively high level at resonance point locations (marked by number 1, 2, 3, and 4 in the figure), and there is good antenna isolation (less than 20 dB) near the resonance point location. Therefore, it can be learned that performance of the antenna in this application meets a requirement.

Figure 11:
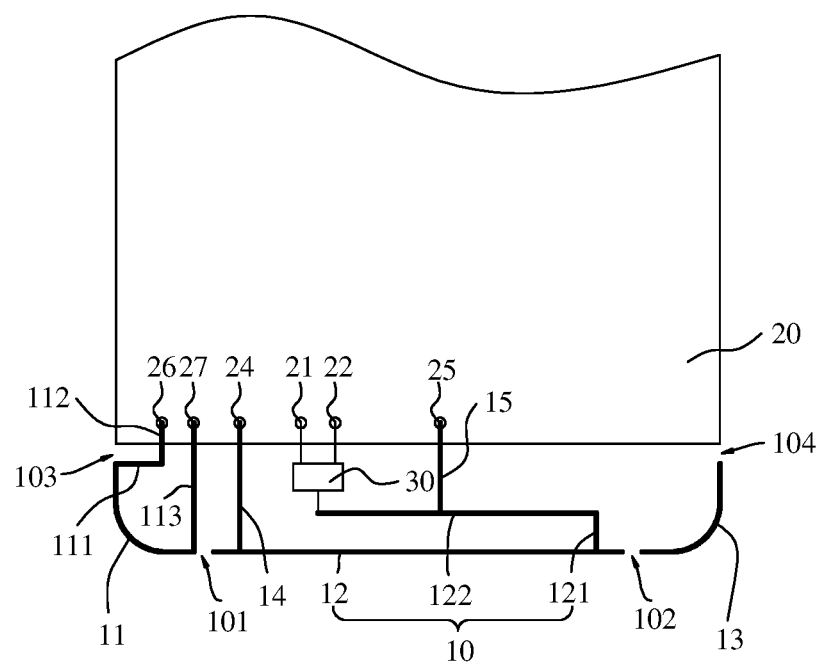
FIG. 11 is a schematic structural diagram of an antenna apparatus disposed on a mobile terminal according to an embodiment of this application.

Referring to FIG. 11, an embodiment is basically the same as the embodiment in FIG. 7. A difference lies in that a second ground point 25 is further disposed on the main board 20, the extension segment 122 is further connected to a second ground segment 15, and the second ground segment 15 is connected to the second ground point 25.

Figure 12:
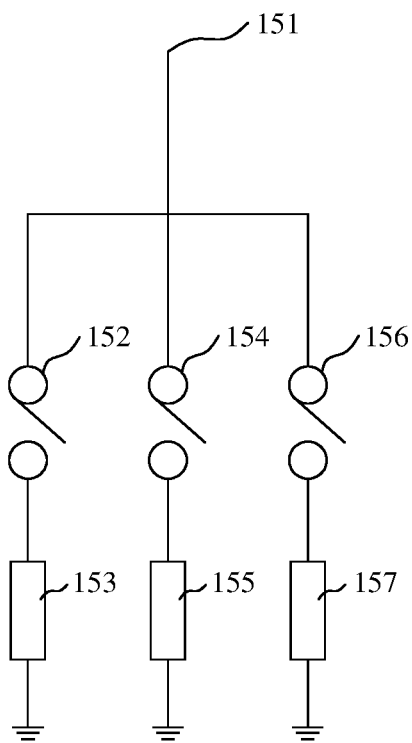
FIG. 12 is a schematic structural diagram of a switch of a second ground segment according to an embodiment of this application.

The second ground segment 15 is of a single-pole multi-throw switch structure. The single-pole multi-throw switch is selectively turned on or off to adjust a resonance frequency of a low frequency signal and broaden an operating frequency band of the low frequency signal. Referring to FIG. 12, in an embodiment, a second ground segment 15 is of a 3SPST switch structure, and includes a connection end 151 connected to an extension segment 122. One end of a first switch 152 is connected to the connection segment 151, and the other end of the first switch 152 is connected to a first device 153. One end of a second switch 154 is connected to the connection end 151, and the other end of the second switch 154 is connected to a second device 155. One end of a third switch 156 is connected to the connection segment 151, and the other end of the third switch 156 is connected to a third device 157. The first device 153, the second device 155, and the third device 157 are separately connected to a second ground point 25 and grounded. The first device 153, the second device 155, and the third device 157 may be inductors or capacitors. The low frequency signal may be tuned by turning on and turning off the first switch 152, the second switch 154, and the third switch 156, so that the low frequency signal has a wider bandwidth.

Figure 9:
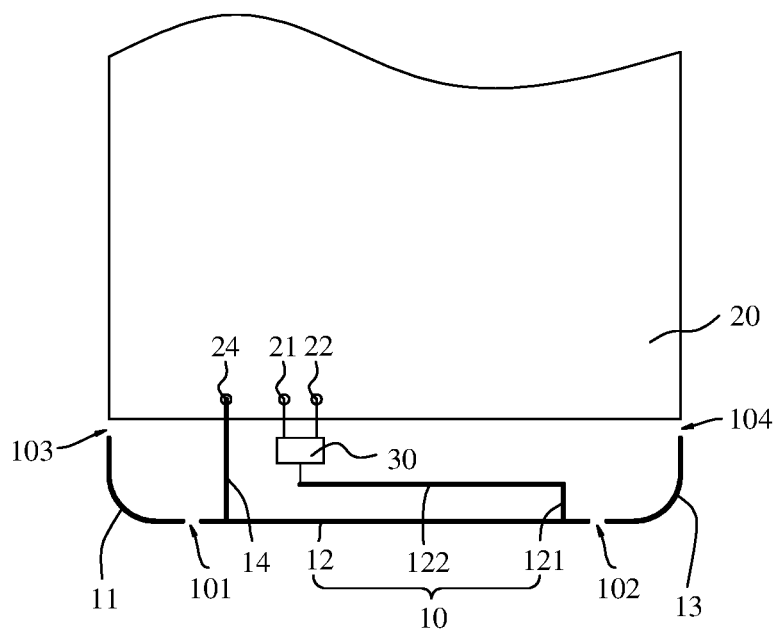
FIG. 9 is a schematic structural diagram of an antenna apparatus disposed on a mobile terminal according to an embodiment of this application.

Referring to FIG. 9, an embodiment is basically the same as the embodiment in FIG. 7. A difference lies in that a third gap 103 and a fourth gap 104 are provided on the second frame 52 of two opposite long edges, so that two opposite ends of the first segment 11 respectively correspond to the first gap 101 and the third gap 103, two opposite ends of the third segment 13 respectively correspond to the second gap 102 and the fourth gap 104, and the first segment 11 and the third segment 13 form a parasitic antenna of the second segment 12.

The parasitic antenna of the second segment 12 is formed by disposing the first segment 11 and the third segment 13, and a current flowing in the second segment 12 generates a coupling current in the first segment 11 and the third segment 13, so that electromagnetic wave radiation is also generated in the first segment 11 and third segment 13. No grounding structure is designed for the first segment 11 and the third segment 13. In this way, a radiation aperture may be increased, and in the intermediate and high frequency bands, an additional resonance is generated in the second segment 12 to increase a bandwidth of an antenna.

Figure 10:
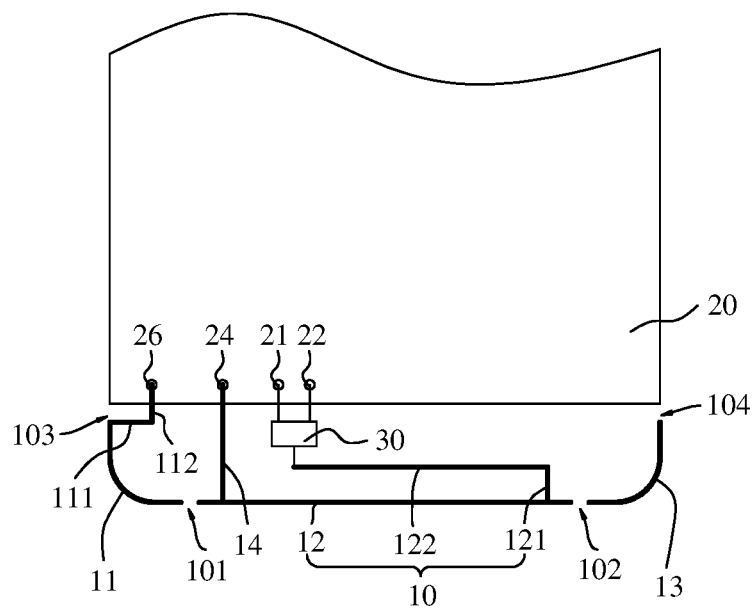
FIG. 10 is a schematic structural diagram of an antenna apparatus disposed on a mobile terminal according to an embodiment of this application.

Referring to FIG. 10, an embodiment is basically the same as the embodiment in FIG. 9. A difference lies in that a third ground point 26 is further disposed on the main board 20, and one end that is of the first segment 11 and that corresponds to the third gap 103 is connected to the third ground point 26.

One end that is of the first segment 11 and that corresponds to the third gap 103 is grounded, so that a parasitic antenna formed in the first segment forms a complete current loop. The end that is of the first segment 11 and that corresponds to the third gap 103 may be sequentially connected to a second connection segment 111 and a third ground segment 112, and be grounded. An extension direction of the second connection segment 11 may be parallel to a second segment 12, so that a spatial structure design in the mobile terminal can be facilitated.

Referring to FIG. 11, an embodiment is basically the same as the embodiment in FIG. 10. A difference lies in that a fourth ground point 27 is further disposed on the main board 10, and one end that is of the first segment 11 and that corresponds to the first gap 101 is connected to the fourth ground point 27.

Ends of the first segment 11 are grounded, so that a parasitic antenna formed in the first segment is a loop antenna, which forms a complete current loop. The end that is of the first segment 11 and that corresponds to the first gap 101 may be connected to the fourth ground segment 113 and grounded.

In this application, a first ground segment 14, a third ground segment 112, and the fourth ground segment 113 each may be disposed as a spring structure.

Figure 13:
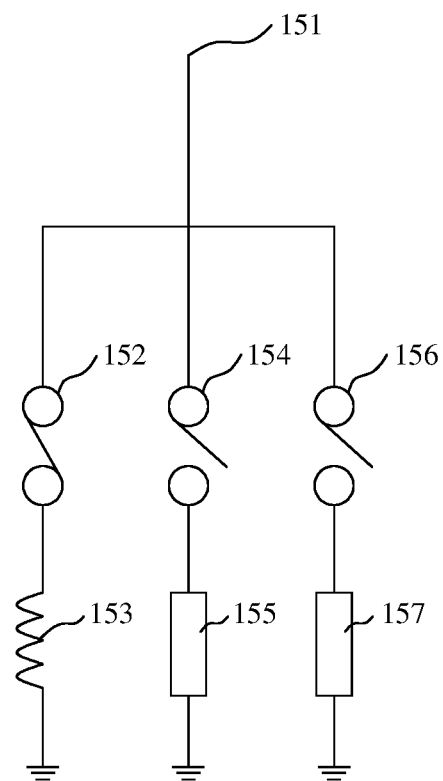
FIG. 13 is a schematic structural diagram of a switch of a second ground segment according to an embodiment of this application.
Figure 14:
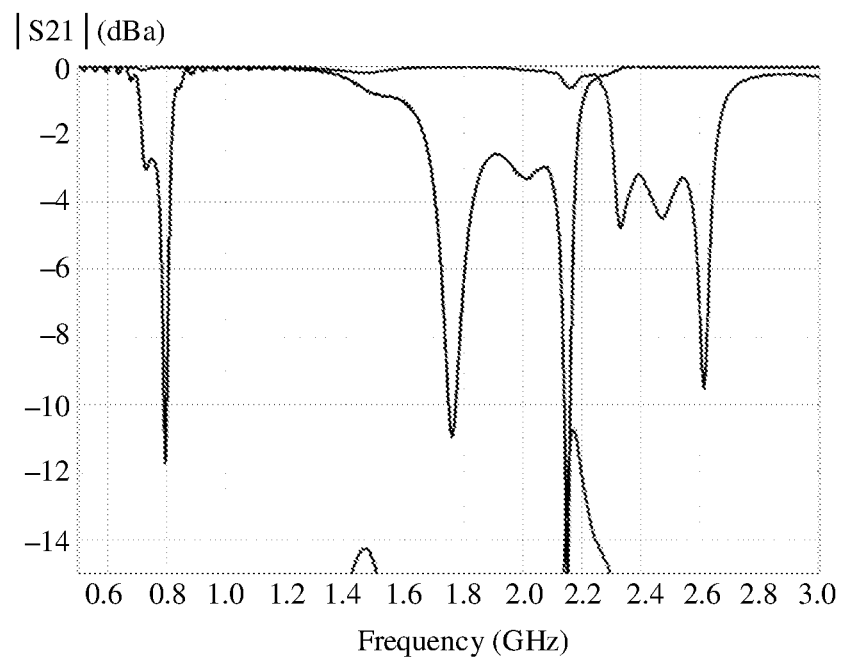
FIG. 14 is a schematic diagram of a simulation result of a return loss (S21) according to an embodiment of this application.
Figure 15:
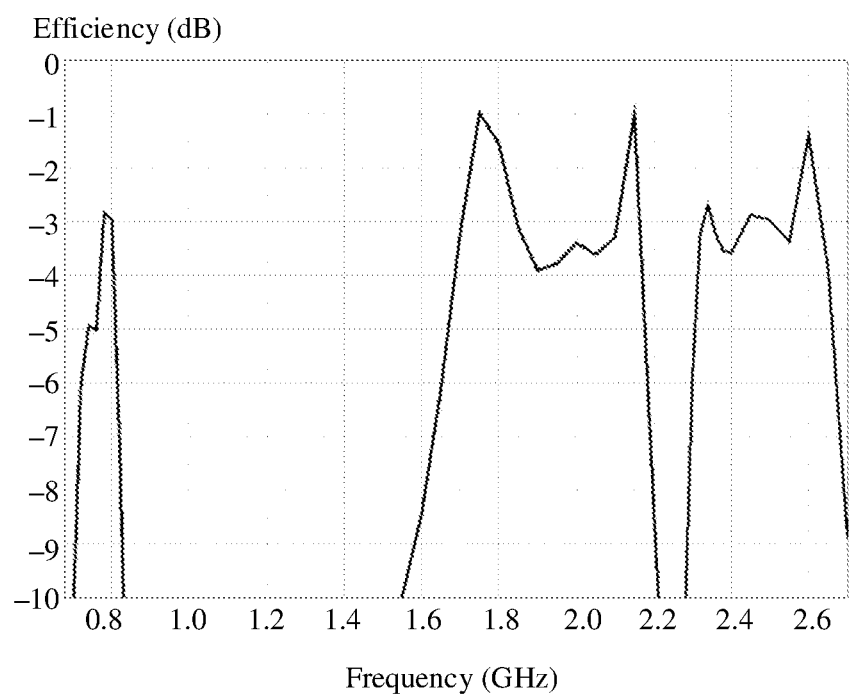
FIG. 15 is a schematic diagram of a simulation result of antenna efficiency according to an embodiment of this application.

Referring to FIG. 14, analog simulation is performed on the antenna apparatus in FIG. 11. With reference to FIG. 13, a first switch 152 of a second ground segment 15 is set to be turned on, a first device 153 is an inductor with an inductance value of 50 nH, a low frequency signal and an intermediate frequency signal are fed by a first feeding part 21, and a high frequency signal is fed by a second feeding part 22. The filter matching network 30 uses the structure in FIG. 2. It can be learned that a low frequency resonance is generated by a loop antenna 0.5λ, intermediate frequency resonances are sequentially generated by a loop antenna 1.0λ, a loop antenna 1.5λ, and a parasitic antenna of a first segment 11, and high frequency resonances are sequentially generated by the parasitic antenna, a matching circuit, and a loop antenna 2.0λ. In terms of antenna isolation, the worst antenna isolation around 2.2 GHz is about 11 dB, which can meet a requirement of multi-frequency communication. Referring to FIG. 15, in terms of antenna system efficiency, an efficient bandwidth of −5 dB at a low frequency may reach 70 MHz, and efficient bandwidths of −4 dB at an intermediate frequency and a high frequency almost cover frequency bands required by the intermediate frequency and the high frequency. It can be learned that the antenna apparatus in this application can meet a requirement of multi-frequency communication.

The antenna apparatus and the mobile terminal provided in the embodiments of this application are described in detail above. The principle and implementation of this application are described herein through specific examples. The description about the embodiments of this application is merely provided to help understand the method and core ideas of this application. In addition, persons of ordinary skill in the art can make variations and modifications to this application in terms of the specific implementations and application scopes according to the ideas of this application. Therefore, the content of specification shall not be construed as a limit to this application.

What is claimed is:

1. A mobile terminal, comprising an antenna apparatus, wherein the antenna apparatus comprising:
    a first feeding part, a second feeding part, a filter matching network, a radiator disposed on a frame of the mobile terminal, a first ground segment, and an extension segment, wherein the filter matching network comprises a first port, a second port, and a third port;
    the first feeding part is electrically connected to the first port, the second feeding part is electrically connected to the second port, and the radiator is electrically connected to the third port;
    wherein the first ground segment is connected between the radiator and a ground, and the extension segment is connected between the radiator and the filter matching network, such that the radiator, the first ground segment and the extension segment form a loop antenna; and the antenna apparatus further comprises a first gap and a second gap disposed on the frame, the first gap and the second gap separating the radiator from other portions of the frame; and
    wherein the first feeding part and the second feeding part are configured to separately transmit a first signal and a second signal of different frequencies to the filter matching network via the first port and the second port, respectively, the first signal and the second signal being signals to be sent to the radiator for transmission, and the filter matching network is configured to perform filtering on the first signal and the second signal to filter out interferences from one to the other, and feed the first signal and the second signal to the radiator via the third port for transmission of the first signal and the second signal.

2. The mobile terminal according to claim 1, wherein the filter matching network comprises a first filter circuit and a second filter circuit, the first filter circuit is electrically connected between the first port and the third port, the second filter circuit is electrically connected between the second port and the third port, the first filter circuit is configured to transmit the first signal and filter out an interference caused by the second signal, and the second filter circuit is configured to transmit the second signal and filter out an interference caused by the first signal.

3. The mobile terminal according to claim 2, wherein the filter matching network further comprises a first matching circuit and a second matching circuit, the first matching circuit is electrically connected between the first port and the first filter circuit, and is configured to perform impedance matching on the first signal, and the second matching circuit is electrically connected between the second port and the second filter circuit, and is configured to perform impedance matching on the second signal.

4. The mobile terminal according to claim 3, wherein the first filter circuit comprises a first inductor, a second inductor, and a first capacitor,
    the first inductor comprises a first end electrically connected to the ground and comprises a second end electrically connected to the first matching circuit,
    the second inductor and the first capacitor are connected in series, and are electrically connected between the ground and the third port, the second inductor comprises a first end connected to the first capacitor, and comprises a second end electrically connected to the third port.

5. The mobile terminal according to claim 4, wherein the second filter circuit comprises a third inductor, a fourth inductor, and a second capacitor,
    the third inductor comprises a first end electrically connected to the ground and comprises a second end electrically connected to the second matching circuit,
    the fourth inductor and the second capacitor are connected in parallel, the fourth inductor comprises a first end electrically connected to the second end of the third inductor, and comprises a second end connected to the third port.

6. The mobile terminal according to claim 5, wherein the first matching circuit comprises a fifth inductor, a sixth inductor, a seventh inductor, a third capacitor, and a fourth capacitor,
    the fifth inductor and the sixth inductor are connected in series between the first port and the ground, and the six inductor comprises a first end connected to the fifth inductor and comprises a second end connected to the ground,
    the third capacitor comprises a first end connected to the ground and comprises a second end connected to the first end of the sixth inductor, and
    the seventh inductor and the fourth capacitor are connected in series between the second end of the third capacitor and the second end of the first inductor; and
    wherein the second matching circuit comprises a fifth capacitor and a sixth capacitor, the fifth capacitor comprises a first end electrically connected to the second port and a second end connected to the ground, and the sixth capacitor is connected between the first end of the fifth capacitor and the second end of the third inductor.

7. The mobile terminal according to claim 3, wherein the first filter circuit comprises a first inductor and a second inductor, the first inductor and the second inductor are connected in series between a ground and the first matching circuit, and the second inductor comprises a first end connected to the ground and comprises a second end electrically connected to the third port.

8. The mobile terminal according to claim 7, wherein the second filter circuit comprises a third inductor and a first capacitor, the third inductor comprises a first end electrically connected to the ground and a second end electrically connected to the second matching circuit, and the first capacitor is electrically connected between the third port and the second end of the third inductor.

9. The mobile terminal according to claim 8, wherein the first matching circuit comprises a fourth inductor and a second capacitor,
the fourth inductor and the second capacitor are connected in series between the first port and the ground, and the second capacitor comprises a first end connected to the ground, and comprises a second end electrically connected to one end of the first inductor; and
wherein the second matching circuit comprises a fifth inductor and a third capacitor, and the fifth inductor and the third capacitor are connected in series between the second port and one end of the third inductor.

10. The mobile terminal according to claim 3, wherein the antenna apparatus further comprises a third feeding part and the filter matching network further comprises a fourth port, the filter matching network further comprises a third filter circuit and a third matching circuit, the third feeding part is electrically connected to the fourth port, the third matching circuit and the third filter circuit are connected in series between the fourth port and the third port, the third feeding part is configured to feed, to the filter matching network, a third signal to be send to the radiator, a highest frequency value of third signal is 960 MHz, and a lowest frequency value of the first signal is 1700 MHz.

11. The mobile terminal according to claim 1, wherein the antenna apparatus further comprises a main board and the frame of the mobile terminal, and the mobile terminal comprises first two opposite sides and second two opposite sides, the first two opposite sides being longer than the second two opposite sides,
the frame comprises a first frame along the second two opposite sides, and comprises a second frame along the first two opposite sides, and
the radiator is disposed on the first frame, and the first feeding part and the second feeding part are disposed on the main board.

12. The mobile terminal according to claim 11, wherein the first gap and the second gap are disposed on a portion of the first frame dividing the portion of the first frame into a first segment, a second segment, and a third segment,
the second segment is located between the first segment and the third segment,
the first segment and the third segment each extend to the second frame, and
the second segment is electrically connected to the filter matching network and forms the radiator.

13. The mobile terminal according to claim 12, wherein the second segment is connected to the first ground segment at a first end portion of the second segment, and the first ground segment is connected to a first ground point, the first ground point disposed on the main board.

14. The mobile terminal according to claim 13, wherein the second segment is connected to a first end of the extension segment at a second end portion of the second segment, and a second end of the extension segment is connected to the filter matching network.

15. The mobile terminal according to claim 14, further comprising a second ground point disposed on the main board, the extension segment is further connected to a second ground segment, and the second ground segment is connected to the second ground point.

16. The mobile terminal according to claim 15, wherein the second ground segment comprises a single-pole multi-throw switch that is selectively turned on or off to adjust a resonance frequency of the first signal.

17. The mobile terminal according to claim 12, wherein a third gap and a fourth gap are provided on the second frame along the first two opposite sides, so that the first segment is defined by the first gap and the third gap, and the third segment is defined by the second gap and the fourth gap, and wherein the first segment and the third segment form a parasitic antenna of the second segment.

18. The mobile terminal according to claim 17, further comprising a third ground point disposed on the main board, and one end that is of the first segment and that corresponds to the third gap is connected to the third ground point.

19. The mobile terminal according to claim 18, further comprising a fourth ground point disposed on the main board, and one end that is of the first segment and that corresponds to the first gap is connected to the fourth ground point.

20. The mobile terminal according to claim 1, further comprising a main board, wherein the main board is configured to feed an electromagnetic wave signal into the antenna apparatus.

* * * * *